(12) United States Patent
Walsh

(10) Patent No.: US 11,289,914 B2
(45) Date of Patent: *Mar. 29, 2022

(54) CRYPTOCURRENCY MINING DATA CENTER WITH A SOLAR POWER DISTRIBUTION AND MANAGEMENT SYSTEM

(71) Applicant: Sean Walsh, San Juan, PR (US)

(72) Inventor: Sean Walsh, San Juan, PR (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/005,318

(22) Filed: Aug. 28, 2020

(65) Prior Publication Data
US 2020/0395761 A1 Dec. 17, 2020

Related U.S. Application Data

(63) Continuation-in-part of application No. 16/115,623, filed on Aug. 29, 2018, now Pat. No. 10,795,428.

(51) Int. Cl.
*H02J 3/38* (2006.01)
*H02J 3/28* (2006.01)
*G05B 19/042* (2006.01)

(52) U.S. Cl.
CPC ............ *H02J 3/381* (2013.01); *G05B 19/042* (2013.01); *H02J 3/28* (2013.01); *G05B 2219/2639* (2013.01); *H02J 2300/24* (2020.01)

(58) Field of Classification Search
CPC ..... G06F 1/3287; G06F 1/263; G06Q 20/065; H02J 3/383; H02J 7/00; H02J 7/35;
(Continued)

(56) References Cited

U.S. PATENT DOCUMENTS 9,513,648 B2 12/2016 Forbes, Jr.
2009/0050192 A1* 2/2009 Tanaka .................... F24S 50/00
136/246
(Continued)

FOREIGN PATENT DOCUMENTS

WO 2014022596 A1 2/2014
WO 2017199053 A1 11/2017
(Continued)

OTHER PUBLICATIONS

Werth, A., Kitamura, N. and Tanaka, K., 2015. Conceptual study for open energy systems: distributed energy network using interconnected DC nanogrids. IEEE Transactions on Smart Grid, 6(4), pp. 1621-1630. (Year: 2015).*
(Continued)

*Primary Examiner* — Rocio Del Mar Perez-Velez
*Assistant Examiner* — Alicia M. Choi
(74) *Attorney, Agent, or Firm* — Legalforce Rapc Worldwide

(57) ABSTRACT

A cryptocurrency computing power supply system includes a solar DC power generation system, a DC power bus, an electronic control system and a mining node power management system. The solar DC power generation system is structured to provide DC power to a DC/DC converter. The DC power bus is structured to selectably receive power from the DC/DC converter and to provide DC power to a number of mining servers. The electronic control system is structured to selectably control the cryptocurrency computing power supply system to operate in plurality of modes. The mining node power management system includes optimizing power distribution from the solar DC power generation system to the plurality of mining servers using a cryptocurrency solar curve algorithm generated based on an analysis
(Continued)

of statistically predicted patterns of energy usage and production.

20 Claims, 10 Drawing Sheets

(58) Field of Classification Search
CPC .... H02J 7/345; H02J 3/381; H02J 3/32; H02J 7/355; H04L 9/0637; Y02E 10/58; Y02E 10/566; Y02E 10/56; Y02B 10/72; Y02B 10/70
USPC ............................................. 700/286
See application file for complete search history.

(56) References Cited

U.S. PATENT DOCUMENTS

| | | | |
|---|---|---|---|
| 2012/0150670 A1 | 6/2012 | Taylor et al. | |
| 2012/0299383 A1* | 11/2012 | Cyuzawa | H02J 3/381 307/75 |
| 2013/0332327 A1 | 12/2013 | Sgouridis et al. | |
| 2017/0063093 A1* | 3/2017 | Wang | H02J 5/00 |
| 2017/0358041 A1 | 12/2017 | Forbes, Jr. et al. | |
| 2018/0165660 A1 | 6/2018 | High et al. | |
| 2018/0254637 A1 | 9/2018 | Abate et al. | |
| 2019/0075686 A1 | 3/2019 | Yu et al. | |

FOREIGN PATENT DOCUMENTS

| | | | |
|---|---|---|---|
| WO | 2018112043 A1 | 6/2018 | |
| WO | 2018160228 A1 | 9/2018 | |
| WO | 2019097546 A1 | 5/2019 | |
| WO | WO 2019/097546 A1 * | 5/2019 | ............. G06Q 50/06 |

OTHER PUBLICATIONS

Prinsloo, G., Mammoli, A. and Dobson, R., 2017. Customer domain supply and load coordination: A case for smart villages and transactive control in rural off-grid microgrids. Energy, 135, pp. 430-441. (Year: 2017).*

Lippman, A. and Ekblaw, A., 2016. Solar Micro-Mining on the Bitcoin Blockchain. Viral Communications. (Year: 2016).*

Goiri, I., Le, K., Haque, M.E., Beauchea, R., Nguyen, T.D., Guitart, J., Torres, J. and Bianchini, R., 2011, November.Greenslot: scheduling energy consumption in green datacenters.In Proceedings of 2011 International Conference for High Performance Computing, Networking, Storage and Analysis (pp. 1-11) (Year: 2011).*

Luke P. Johnson, Ahmed Isam, Nick Gogerty, Joseph Zitoli, Connecting the Blockchain To the Sun To Save the Planet; https:/www.researchgate.net/publication/314545542_Connecting_the_Blockchain_to_the_Sun_to_Save_the_Planet; Nov. 9, 2015. (Year: 2015).*

Chien-Ming Cheng, Shiao-Li Tsao, and Pei-Yun Lin. SEEDS: A Solar-Based Energy-Efficient Distributed Server Farm. IEEE Transactions On Systems, Man, and Cybernetics: Systems, vol. 45, No. 1, Jan. 2015 (pp. 143-156). (Year: 2015).*

* cited by examiner

CRYPTOCURRENCY MINING DATA CENTER WITH A SOLAR POWER DISTRIBUTION AND MANAGEMENT SYSTEM

CLAIM OF PRIORITY

This application is a Continuation-in-Part Application of, and thereby claims priority to, U.S. patent application Ser. No. 16/115,623 titled CRYPTOCURRENCY PROCESSING CENTER SOLAR POWER DISTRIBUTION ARCHITECTURE filed on Aug. 29, 2018. The contents of the aforementioned application are incorporated by reference in entirety thereof.

FIELD OF TECHNOLOGY

This disclosure relates generally to energy management system and, more particularly, to a method, a device and/or a system of cryptocurrency processing center solar power distribution architecture.

BACKGROUND

One of the biggest costs in operating a cryptocurrency data center may be power cost. Power is needed to operate mining nodes and storage systems (e.g., collectively "mining servers"). Since each mining node of the cryptocurrency data center may heat up, more power may be needed in order to provide other cooling systems. Each mining node may be a powerful computer that runs the cryptocurrency software and helps to keep a cryptocurrency network running by participating in the relay of information.

Each mining node can operate when a user (e.g., called a miner) downloads a cryptocurrency software and leaves a certain port open for mining cryptocurrency. The mining node may consume continuous amounts of energy in predictable patterns and massive amounts of storage space (e.g., 150 gigabytes).

SUMMARY

Disclosed are systems of a cryptocurrency processing solar power distribution architecture.

In one aspect, a cryptocurrency computing power supply system includes a solar DC power generation system to provide DC power to a DC/DC converter, with the solar DC power generation system including a number of photovoltaic generation units, each of which includes a tracker, a DC power bus to selectably receive power from the DC/DC converter, a number of mining servers to receive DC power provided using the DC power bus, and an electronic control system to selectably control the cryptocurrency computing power supply system to operate in a number of modes including a first mode in which at least some of a set of AC mining loads are powered by an AC power grid and an AC generator and the number of mining servers is powered by the solar DC power generation system, and a second mode in which the at least some of the set of AC mining loads are powered by the solar DC power generation system using a power inverter along with the number of mining servers powered by the solar DC power generation system.

The cryptocurrency computing power supply system further includes a mining node power management system to apply a cryptocurrency solar curve algorithm based on an analysis of statistically predicted patterns of energy usage and production relevant to known mathematical puzzles being solved by groups of the number of mining nodes seeking to add outstanding transactions grouped into blocks to a blockchain database associated with a specific type of cryptocurrency, with the cryptocurrency solar curve algorithm further providing a predicted energy consumption pattern based on energy consumption data received from the number of mining servers and/or the set of AC mining loads. The tracker of the each of the number of photovoltaic generation units adjusts orientation of components of the each of the number of photovoltaic generation units such that solar energy captured thereby is maximized, and the mining node power management system further optimizes distribution of power from the solar DC power generation system to the number of mining servers based on the first mode and the second mode and the application of the cryptocurrency solar curve algorithm in accordance with monitoring the each of the number of photovoltaic generation units including the tracker.

In another aspect, a cryptocurrency computing power supply system includes a number of computers operating as a number of mining servers that continuously consumes energy in a predictable pattern based on a type of cryptocurrency being mined, a solar DC power generation system to provide DC power to a DC/DC converter, with the solar DC power generation system including a number of photovoltaic generation units, each of which includes a tracker, a DC power bus to selectably receive power from the DC/DC converter and to provide DC power to the number of mining servers, and an electronic control system to selectably control the cryptocurrency computing power supply system to operate in a number of modes including a first mode in which at least some of a set of AC mining loads are powered by an AC power grid and an AC generator and the number of mining servers is powered by the solar DC power generation system, and a second mode in which the at least some of the set of AC mining loads are powered by the solar DC power generation system using a power inverter along with the number of mining servers powered by the solar DC power generation system.

The cryptocurrency computing power supply system further includes a mining node power management system to apply a cryptocurrency solar curve algorithm based on an analysis of statistically predicted patterns of energy usage and production relevant to known mathematical puzzles being solved by groups of the number of mining nodes seeking to add outstanding transactions grouped into blocks to a blockchain database associated with the type of cryptocurrency mined, with the cryptocurrency solar curve algorithm further providing a predicted energy consumption pattern based on energy consumption data received from the number of mining servers and/or the set of AC mining loads. The tracker of the each of the number of photovoltaic generation units adjusts orientation of components of the each of the number of photovoltaic generation units such that solar energy captured thereby is maximized, and the mining node power management system further optimizes distribution of power from the solar DC power generation system to the number of mining servers based on the first mode and the second mode and the application of the cryptocurrency solar curve algorithm in accordance with monitoring the each of the number of photovoltaic generation units including the tracker.

In yet another aspect, a cryptocurrency computing power supply system includes a solar DC power generation system to provide DC power to a DC/DC converter, with the solar DC power generation system including a number of photovoltaic generation units, each of which includes a tracker, and a number of fuel cells to output the DC power to the DC/DC converter. The cryptocurrency computing power supply system also includes a DC power bus to selectably receive power from the DC/DC converter, a number of mining servers to receive DC power provided using the DC power bus, and an electronic control system to selectably control the cryptocurrency computing power supply system to operate in a number of modes including a first mode in which at least some of a set of AC mining loads are powered by an AC power grid and an AC generator and the number of mining servers is powered by the solar DC power generation system, and a second mode in which the at least some of the set of AC mining loads are powered by the solar DC power generation system using a power inverter along with the number of mining servers powered by the solar DC power generation system.

The cryptocurrency computing power supply system further includes a mining node power management system to apply a cryptocurrency solar curve algorithm based on an analysis of statistically predicted patterns of energy usage and production relevant to known mathematical puzzles being solved by groups of the number of mining nodes seeking to add outstanding transactions grouped into blocks to a blockchain database associated with a specific type of cryptocurrency, with the cryptocurrency solar curve algorithm further providing a predicted energy consumption pattern based on energy consumption data received from the number of mining servers and/or the set of AC mining loads. The tracker of the each of the number of photovoltaic generation units adjusts orientation of components of the each of the number of photovoltaic generation units such that solar energy captured thereby is maximized, and the mining node power management system further optimizes distribution of power from the solar DC power generation system to the number of mining servers based on the first mode and the second mode and the application of the cryptocurrency solar curve algorithm in accordance with monitoring the each of the number of photovoltaic generation units including the tracker.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
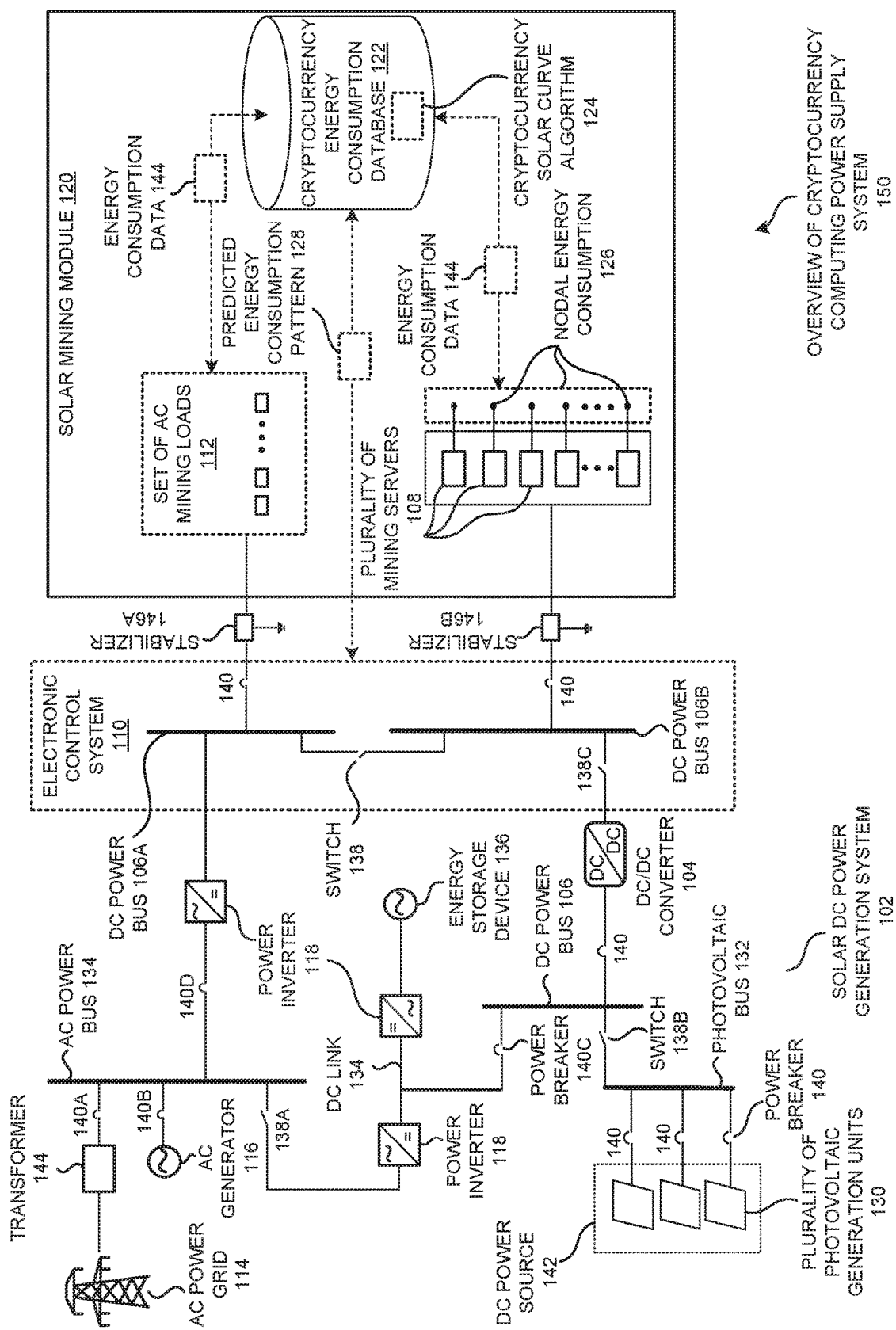
FIG. 1 is a structural overview of a cryptocurrency computing power supply system illustrating the optimization of power distribution using a cryptocurrency solar curve algorithm of a cryptocurrency energy consumption database of a solar mining module, according to one embodiment.

Other features of the present embodiments will be apparent from the accompanying drawings and from the detailed description that follows.

DETAILED DESCRIPTION

Example embodiments, as described below, may be used to provide a method, a device and/or a system of a cryptocurrency processing solar power distribution architecture.

In one embodiment, a modular cryptocurrency computing power supply system includes a solar DC power generation system 102, a DC power bus 106, an electronic control system 110 and a solar mining module 120 (e.g., mining node power management system). The solar DC power generation system 102 is structured to provide DC power to a DC/DC converter 104. The DC power bus 106 is structured to selectably receive power from the DC/DC converter 104 and to provide DC power to a plurality of mining servers 108.

The electronic control system 110 is structured to selectably control the modular cryptocurrency computing power supply system to operate in plurality of modes. In a first mode, at least some of a set of AC mining loads 112 are powered by an AC power grid 114 and an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The solar mining module 120 (e.g., mining node power management system) includes optimizing power distribution from the solar DC power generation system 102 to the plurality of mining servers 108 using a cryptocurrency solar curve algorithm 124 generated based on an analysis of statistically predicted patterns of energy usage and/or production. The analysis of statistically predicted patterns of energy usage and/or production is based on computational needs of known mathematical puzzles being solved by groups of the plurality of mining nodes (e.g., plurality of mining servers 108) seeking to add outstanding transactions grouped into blocks to a blockchain database associated with a specific type of cryptocurrency.

The solar DC power generation system 102 may include a plurality of photovoltaic generation units 130, a photovoltaic bus 132 and a second converter. The photovoltaic bus 132 may be operatively coupled with the plurality of photovoltaic generation units 130 and/or the DC/DC converter 104. The second converter may include a DC link operatively coupled with the photovoltaic bus 132, a first output operatively coupled with an AC power bus 134 and a second output operatively coupled with an energy storage device 136. The energy storage device 136 may include an electric machine coupled with a flywheel, a battery, and/or a supercapacitor.

The electronic control system 110 may be structured to control the modular cryptocurrency computing power supply system to selectably supply power from the AC power bus 134 and/or the solar DC power generation system 102 to the energy storage device 136.

The electronic control system 110 may be structured to selectably supply power from the energy storage device 136 to the AC power bus 134 and/or the photovoltaic bus 132.

The electronic control system 110 may be structured to route power from the energy storage device 136 to the photovoltaic bus 132 and/or the AC power bus 134 during a transition from the first mode and/or the second mode.

The solar DC power generation system 102 may include a plurality of fuel cells structured to output DC power to the DC/DC converter 104. The electronic control system 110 may be structured to control the modular cryptocurrency computing power supply system to selectably supply power from the plurality of fuel cells to the DC power bus 106 alone and/or a combination of the DC power bus 106 and the AC power bus 134.

The solar DC power generation system 102 may include a solar DC power source 142, a second DC power bus 106, and a second converter. The second DC power bus 106 may be operatively coupled with the solar DC power source 142 and the DC/DC converter 104.

The second converter may be operatively coupled with the second DC power bus 106. A first output of the second converter may be operatively coupled with the AC power bus 134 and a second output may be operatively coupled with the energy storage device 136.

In another embodiment, a method of a cryptocurrency computing power supply system includes structuring a solar DC power generation system 102 to provide DC power to a DC/DC converter 104. The method includes structuring a DC power bus 106 to selectably receive power from the DC/DC converter 104 and providing DC power to a plurality of mining servers 108 using the DC power bus 106. The method further includes selectably controlling the cryptocurrency computing power supply system using an electronic control system 110 structured to operate in plurality of modes. In a first mode, at least some of a set of AC mining loads 112 are powered by an AC power grid 114 and an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The method further includes applying a cryptocurrency solar curve algorithm 124 of a solar mining module 120 (e.g., mining node power management system) based on an analysis of statistically predicted patterns of energy usage and/or production. The analysis of statistically predicted patterns of energy usage and/or production is based on computational needs of known mathematical puzzles being solved by groups of the plurality of mining nodes seeking to add outstanding transactions grouped into blocks to a blockchain database associated with a specific type of cryptocurrency. Furthermore, the method includes optimizing a distribution of power from the solar DC power generation system 102 to the plurality of mining servers 108 using the solar mining module 120 (e.g., mining node power management system).

The method may further include operatively coupling a plurality of photovoltaic generation units 130 with a photovoltaic bus 132 and/or the DC/DC converter 104 to form the solar DC power generation system 102. The method may operatively couple a second converter including a DC link with the photovoltaic bus 132. A first output may be operatively coupled with an AC power bus 134. A second output may be operatively coupled with an energy storage device 136.

The energy storage device 136 may include an electric machine coupled with a flywheel, a battery, and/or a supercapacitor. The method may further include controlling the cryptocurrency computing power supply system to selectably supply power from the AC power bus 134 and/or the solar DC power generation system 102 to the energy storage device 136 using the electronic control system 110.

The method may further include selectably supplying power from the energy storage device 136 to the AC power bus 134 and/or the photovoltaic bus 132 using the electronic control system 110. In addition, the method may include routing power from the energy storage device 136 to the photovoltaic bus 132 and/or the AC bus during a transition from the first mode and/or the second mode using the electronic control system 110. The solar DC power generation system 102 may include a plurality of fuel cells structured to output DC power to the DC/DC converter 104.

The method may include controlling the cryptocurrency computing power supply system to selectably supply power from the plurality of fuel cells to the DC power bus 106 alone and/or a combination of the DC power bus 106 and the AC power bus 134 using the electronic control system 110.

The method of solar DC power generation system 102 may include a solar DC power source 142, a second DC power bus 106 and a second converter. The second DC power bus 106 may be operatively coupled with the solar DC power source 142 and the DC/DC converter 104. The second converter may be operatively coupled with the second DC power bus 106. The second converter may include a first output operatively coupled with the AC power bus 134 and a second output operatively coupled with the energy storage device 136.

In yet another embodiment, a cryptocurrency computing power supply system includes a plurality of computers operating as a plurality mining servers, a solar DC power generation system 102, a DC power bus 106, an electronic control system 110, and a solar mining module 120 (e.g., mining node power management system). The plurality mining servers continuously consume energy in a predictable pattern based on a type of cryptocurrency being mined.

The solar DC power generation system 102 is structured to provide DC power to a DC/DC converter 104. The DC power bus 106 is structured to selectably receive power from the DC/DC converter 104 and to provide DC power to the plurality of mining servers 108.

The electronic control system 110 is structured to selectably control the cryptocurrency computing power supply system to operate in plurality of modes. In a first mode, at least some of a set of AC mining loads 112 are powered by an AC power grid 114 and/or an AC generator 116, and the plurality of mining servers 108 are powered by the solar DC power generation system 102. In a second mode, at least some of the set of AC mining loads 112 are powered by the solar DC power generation system 102 using a power inverter 118 along with the plurality of mining servers 108 powered by the solar DC power generation system 102.

The solar mining module 120 (e.g., mining node power management system) optimizes the power distribution from the solar DC power generation system 102 to the plurality of mining servers 108 using a cryptocurrency solar curve algorithm 124 generated based on an analysis of statistically predicted patterns of energy usage and/or production. The analysis of statistically predicted patterns of energy usage and/or production is based on computational needs of known mathematical puzzles being solved by groups of the plurality of mining nodes seeking to add outstanding transactions grouped into blocks to a blockchain database associated with the type of cryptocurrency being mined.

The solar DC power generation system 102 may include a plurality of photovoltaic generation units 130, a photovoltaic bus 132, and a second converter. The photovoltaic bus 132 may be operatively coupled with the plurality of photovoltaic generation units 130 and the DC/DC converter 104. The second converter may include a DC link operatively coupled with the photovoltaic bus 132. A first output may be operatively coupled with an AC power bus 134 and a second output may be operatively coupled with an energy storage device 136.

FIG. 1 is a structural overview of a cryptocurrency computing power supply system 150 illustrating the optimization of power distribution using a cryptocurrency solar curve algorithm 124 of a cryptocurrency energy consumption database 122 of a solar mining module 120 (e.g., mining node power management system), according to one embodiment. Particularly, FIG. 1 illustrates a solar DC power generation system 102, a DC/DC converter 104, a DC power bus 106, 106A, 106B, a plurality of mining servers 108, an electronic control system 110, a set of AC mining loads 112, an AC power grid 114, an AC generator 116, a power inverter 118, a solar mining module 120, a cryptocurrency energy consumption database 122, a cryptocurrency solar curve algorithm 124, a nodal energy consumption 126, predicted energy consumption pattern 128, a plurality of photovoltaic generation units 130, a photovoltaic bus 132, an AC power bus 134, an energy storage device 136, a switch 138, 138A, 138B, a power breaker 140, 140A, 140B, 140C, 140D, a solar DC power source 142, a transformer 144, and a stabilizer 146A, 146B, according to one embodiment.

The solar DC power generation system 102 may be a system of conversion of energy from sunlight into unidirectional flow of electricity (e.g., electric charge), directly using photovoltaics (PV), indirectly using concentrated solar power, and/or a combination thereof. The solar DC power generation system 102 may convert the sun's rays into electricity by exciting electrons in silicon cells using the photons of light from the sun. The solar DC power generation system 102 may use lenses and/or mirrors and tracking systems (e.g., tracker with altitude adjustment 602) to focus a large area of sunlight into a small beam, according to one embodiment.

The DC/DC converter 104 may be an electronic circuit and/or electromechanical device that convert a source of direct current (DC) from one voltage level to another. The DC/DC converter 104 may receive DC power from the solar DC power generation system 102 and transmit it to the DC power bus 106 at a desired voltage level, according to one embodiment.

The DC power bus 106 may be a conductor and/or a group of conductors used for collecting electric power from the incoming DC feeders (e.g., DC power source 142) and distributes them to the outgoing feeders (e.g., power load, set of AC mining loads 112, plurality of mining servers 108). According to once embodiment, the DC power bus 106 may receive power from the AC power grid 114 and/or from the DC power source 142, according to one embodiment.

Further, the DC power bus 106 may be structured to receive power from the DC/DC converter 104 and/or power inverter 118 and distribute them to the plurality of mining servers 108 and/or set of AC mining loads 112, according to one embodiment.

The DC power bus 106B may be configured to discretionarily receive power from the DC/DC converter 104 and to provide DC power to the plurality of mining servers 108. In another embodiment, the DC power bus 106A may be configured to discretionarily receive DC power from the power inverter 118 and to provide AC power to the set of AC mining loads 112, according to one embodiment.

The plurality of mining servers 108 may be a number of computers, and/or a computer programs that is dedicated to managing network resources to solve complex problems to verify digital transactions using computer hardware (e.g., using a graphics card). Each mining node of the plurality of mining servers 108 may be a powerful computer that runs the cryptocurrency software and helps to keep a cryptocurrency network running by participating in the relay of information. Each mining node of the plurality of mining servers 108 may consume continuous amounts of energy in predictable patterns and massive amounts of storage space, according to one embodiment.

The electronic control system 110 may be a physical interconnection of devices that influences the behaviour of other devices and/or systems (e.g., plurality of mining servers 108). The electronic control system 110 may be defined as a process that transforms one signal into another so as to give the desired system response. The electronic control system 110 may be configured to discretionarily control the cryptocurrency computing power supply system to operate in plurality of modes. In a first mode, the electronic control system 110 may enable the set of AC mining loads 112 to be powered by the AC power grid 114 and the AC generator 116, and the plurality of mining servers 112 to be powered by the solar DC power generation system 102. In a second mode, the electronic control system 110 may enable some of the set of AC mining loads 112 to be powered by the solar DC power generation system 102 using the power inverter 118 along with the plurality of mining servers 108 to be powered by the solar DC power generation system 102, according to one embodiment.

The set of AC mining loads 112 may be the electrical power consumed by a number of networked computers and/or storage that an array of solar mining modules 120 (e.g., mining node power management system) use to organize, process, store and disseminate large amounts of data.

The set of AC mining loads 112 may include the electrical power consumed for running the plurality of mining servers 108 and providing air conditioning and other cooling systems of the cryptocurrency farm, according to one embodiment.

The AC power grid 114 may be an interconnected network for delivering alternating current from producers to consumers. The AC power grid 114 may consist of generating stations that produce electrical power, high voltage transmission lines that carry power from distant sources to demand centers (e.g., plurality of mining servers 108, set of AC mining loads 112), and distribution lines that connect individual customers (e.g., mining server). The AC power grid 114 may deliver alternating current to the plurality of mining servers 108 and/or set of AC mining loads 112. The AC power grid 114 may be operatively coupled to the AC power bus 134 by way of transformer 144 and the power breaker 140, according to one embodiment.

The AC generator 116 may be an electrical device which converts mechanical energy to electrical energy to power the plurality of mining servers 108 and/or the set of AC mining loads 112 of the cryptocurrency mining system, according to one embodiment.

The power inverter 118 may be an electronic device and/or circuitry that changes direct current (DC) to alternating current (AC). The power inverter 118 may convert the direct current (DC) from the DC power source 142 to alternating current (AC), according to one embodiment.

The solar mining module 120 (e.g., mining node power management system) may be a collection of elements and/or components that are organized for a common purpose of controlling the power supply to each of the mining nodes of the plurality of mining servers 108 and the set of AC mining loads 112, according to one embodiment.

The cryptocurrency energy consumption database 122 may be an organized collection of information of energy consumption by the plurality of mining servers 108 and the set of AC mining loads 112 that can be easily accessed, managed and updated by the solar mining module 120 (e.g., mining node power management system), according to one embodiment.

The cryptocurrency solar curve algorithm 124 may be a process and/or set of rules that need to be followed for calculating the predicted energy consumption pattern 128 of the plurality of mining servers 108, according to one embodiment. The nodal energy consumption 126 may be the amount of power utilized for running each node of the plurality of mining servers 108 and the set of AC mining loads 112.

The predicted energy consumption pattern 128 may be an estimated amount of power consumption calculated based on the analysis of large quantity of numerical data of predicted patterns of energy usage by the plurality of mining servers 108 using the cryptocurrency solar curve algorithm 124 of the cryptocurrency energy consumption database 122. The predicted energy consumption pattern 128 may be based on the energy consumption data 144 received from the plurality of mining servers 108 and/or the set of AC mining loads, according to one embodiment.

The plurality of photovoltaic generation units 130 may be a power generation system designed to convert the solar light into electricity using semiconducting materials that exhibit the photovoltaic effect. The plurality of photovoltaic generation units 130 may supply usable solar power by means of photovoltaics. The plurality of photovoltaic generation units 130 may consist of an arrangement of several components, including solar panels to absorb and convert sunlight into electricity, a solar inverter to change the electric current from DC to AC, as well as mounting, cabling, and other electrical accessories to set up a working system, according to one embodiment.

The photovoltaic bus 132 may be a conductor and/or a group of conductors used for collecting electric power from the plurality of photovoltaic generation units 130 and distribute them to the outgoing feeders (e.g., power load, DC power bus 106), according to one embodiment.

The AC power bus 134 may be a conductor and/or a group of conductors used for collecting electric power from the AC power grid 114 and distributing them to the outgoing feeders (e.g., power load, plurality of mining servers 108, set of AC mining loads 112). The AC power bus 134 may be a vertical line at which the several components of the power system like AC generators, loads, and feeders, etc., are connected, according to one embodiment.

The energy storage device 136 may be a device that stores energy for later use. The energy storage device 136 may store energy supplied from the DC power source 142 and/or from the AC power grid 114 to be used at the time power supply failure from any one of the two. According to one embodiment, the energy storage device 136 may be an electric machine coupled with a flywheel, a battery, and/or a supercapacitor. The energy storage device 136 may be coupled to the power inverter 118 which is configured to receive the DC power, convert it to the AC power, and provide AC power to the plurality of mining servers 108 and/or set of AC mining loads 112, according to one embodiment.

The switch 138 may be a device for making and breaking the connection in an electric circuit. The switch 138 may be used by the electronic control system 110 to control the continuous power supply to the plurality of mining servers 108 and/or the set of AC mining loads 112, according to one embodiment.

The power breaker 140 may be an automatically operated electrical switch designed to protect an electrical circuit from damage caused by excess current from an overload and/or short circuit. Circuit breakers (e.g., power breaker 140) may also be used in the event of pre-existing damage to electrical systems in the cryptocurrency computing power supply system. The power breaker 140 may be configured to disrupt the flow of current between the AC power grid 114 and AC power bus 134 to protect the electrical circuit of cryptocurrency computing power supply system from damage caused by excess current from an overload and/or short circuit. In various embodiments, the power breaker 140 may be designed to automatically disrupt the flow of current in a particular segment to isolate it from the rest of circuitry of the cryptocurrency computing power supply system to enable uninterrupted power supply to the rest of cryptocurrency mining circuitry, according to one embodiment.

The solar DC power source 142 may be a power generation system to produce DC power using solar energy. The solar DC power source 142 may include a plurality of photovoltaic generation units 130 to generate DC power, according to one embodiment.

The transformer 144 may be a static electrical device that transfers electrical energy between two or more circuits through electromagnetic induction. The transformer 144 may be used to transfer AC power from the AC power grid 114 by increasing or decreasing the alternating voltages to the supply to the plurality of mining servers 108 and/or the set of AC mining loads 112, according to one embodiment.

The stabilizer 146 may be an electrical device used to feed constant voltage current to electrical load. The stabilizer 146 may be an electronic device responsible for correcting the voltage of the electrical power supply to provide a stable and secure power supply to the electrical load of cryptocurrency mining (e.g., plurality of mining servers 108, set of AC mining loads 112). The stabilizer 146 may allow for a stable voltage and protect the equipment from most of the problems of the mains of the of cryptocurrency computing power supply system, according to one embodiment.

In another embodiment, the stabilizer 146A may be configured to receive DC power from the DC power bus 106A and supply a stable AC power to the set of AC mining loads 112. The stabilizer 146B may be structured to receive DC power from the DC power bus 106B and supply DC power to the plurality of mining servers at a constant voltage.

Figure 2A:
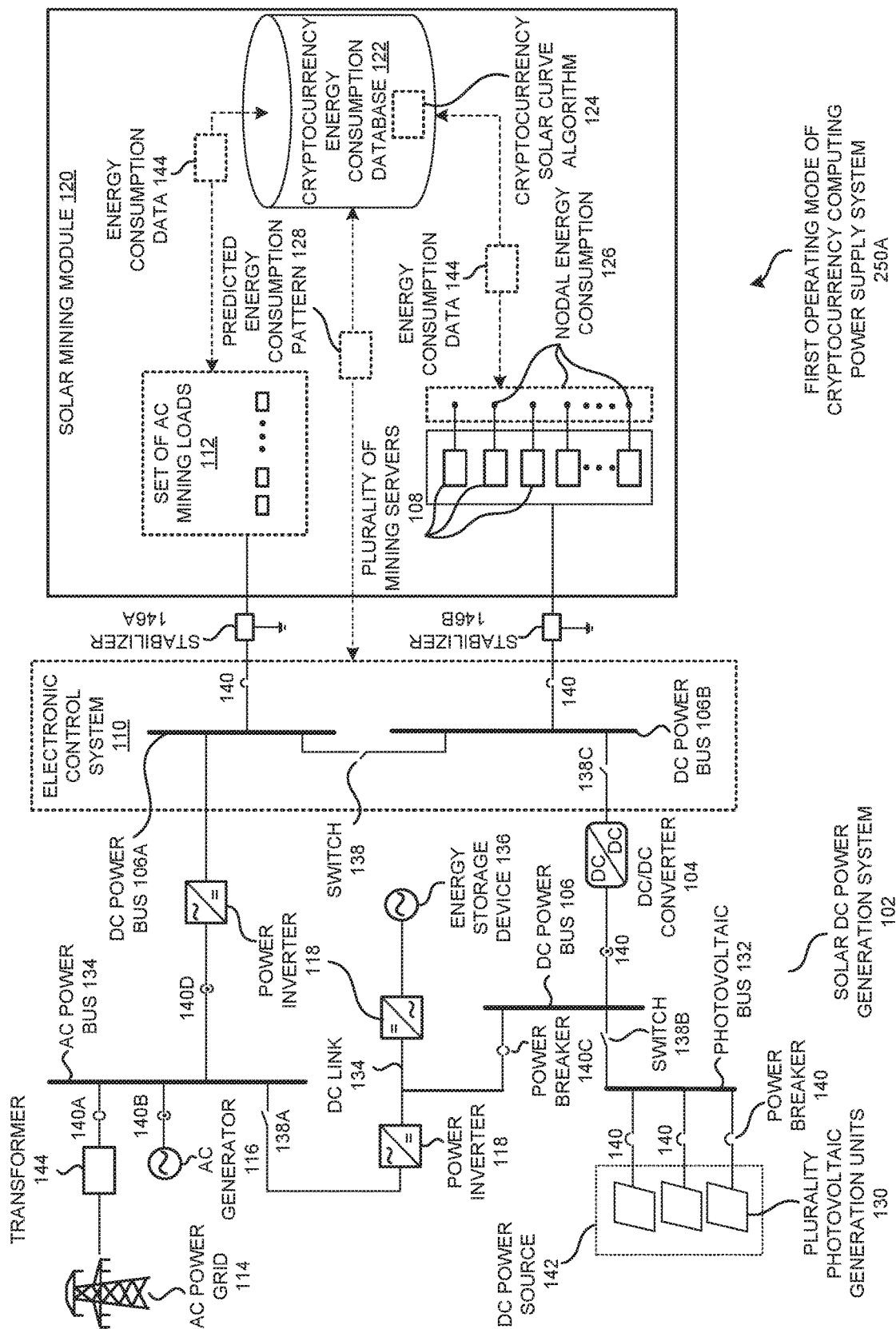
FIG. 2A is an overview illustrating a system of cryptocurrency computing power supply system of FIG. 1 operated in a first mode, according to one embodiment.

FIG. 2A is an overview illustrating a system of the cryptocurrency computing power supply system 250A of FIG. 1 operated in a first mode, according to one embodiment. The electronic control system 110 may be configured to discretionarily control the power supply to the set of AC mining loads 112 and the plurality of mining servers 112.

The electronic control system 110 may be structured to regulate the power supply to the set of AC mining loads 112 and the plurality of mining servers 112 by controlling the power breakers 140, switches 138, DC/DC converter 104, power inverter 118, stabilizer 146 and AC generator 116 of the cryptocurrency computing power supply system, according to one embodiment.

The electronic control system 110 may be configured such that in the first operating mode, the set of AC mining loads 112 is powered by the AC power grid 114 and the AC generator 116, and the plurality of mining servers 112 is powered by the solar DC power generation system 102, according to one embodiment.

In the first operating mode, the electronic control system 110 may actuate the AC generator 116, and open power breakers 140A, 140C, and opens switch 138A, in order to power the set of AC mining loads 112 using AC power generated from the AC power grid 114 and the AC generator 116 and the plurality of mining servers 112 is powered by the solar DC power generation system 102, according to one embodiment.

Figure 2B:
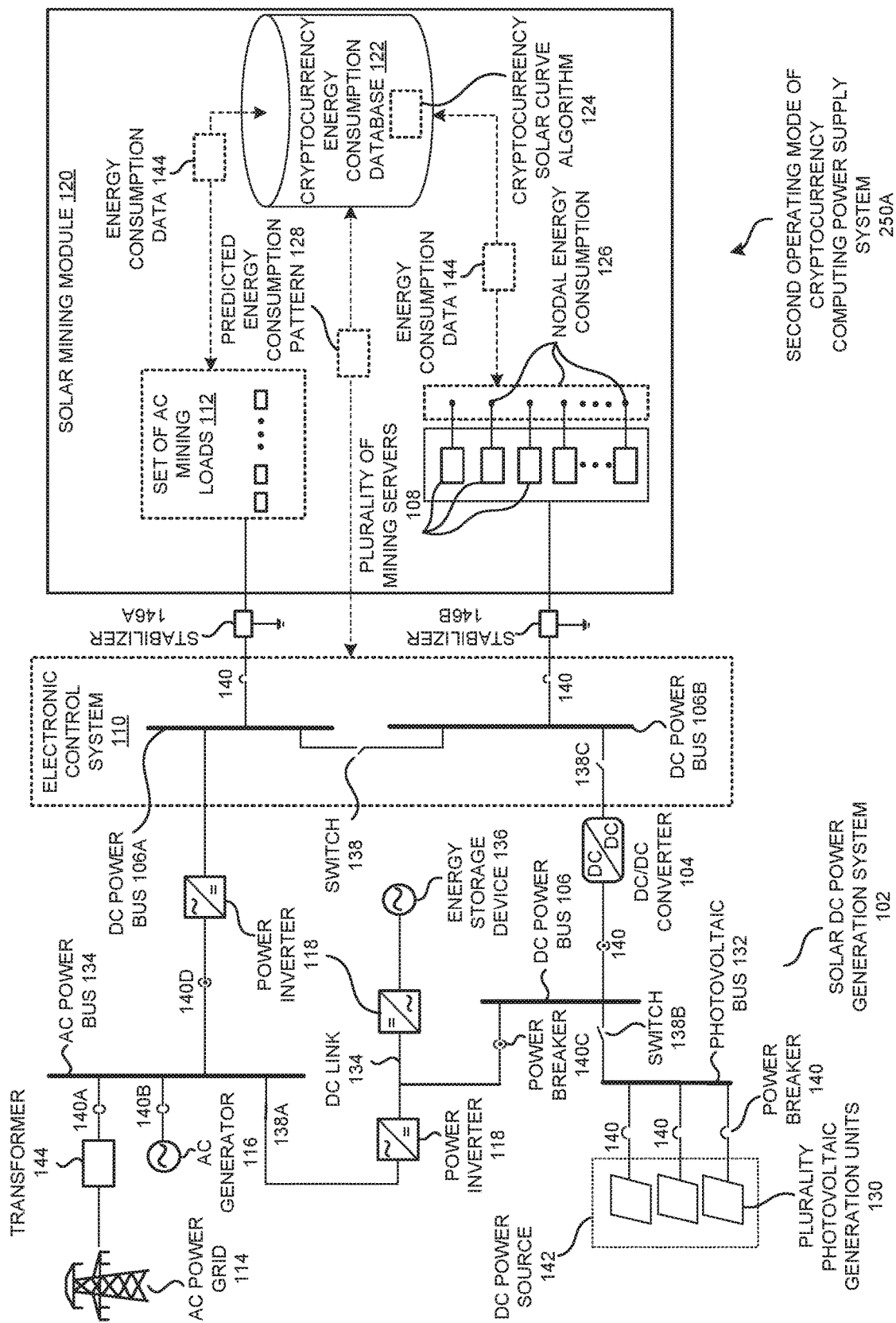
FIG. 2B another overview illustrating the system of cryptocurrency computing power supply system of FIG. 1 operated in a second mode, according to one embodiment.

FIG. 2B is another overview illustrating the system of cryptocurrency computing power supply system 250B of FIG. 1 operated in a second mode, according to one embodiment. In the second operating mode, the electronic control system 110 may be configured such that some of the set of AC mining loads 112 is powered by the solar DC power generation system 102 using the power inverter 118 along with the plurality of mining servers 108 powered by the solar DC power generation system 102, according to one embodiment.

In the second operating mode, the electronic control system 110 may open power breaker 140A and 140B, and closes switch 138A to power the set of AC mining loads 112 from the power generated by the solar DC power generation system 102 using the power inverter 118 along with the plurality of mining servers 108 powered by the solar DC power generation system 102, according to one embodiment.

The electronic control system 110 may manage the power supply to the plurality of mining servers 108 and the set of AC mining loads 112 based on the predicted energy consumption pattern 128 of the solar mining module 120. The solar mining module 120 (an example mining node power management system applying cryptocurrency solar curve algorithm 124) may derive the predicted energy consumption pattern 128 using the cryptocurrency solar curve algorithm 124 of the energy consumption database 122. The electronic control system 110 may manage the power supply based on the predicted energy consumption pattern 128 of the solar mining module 120, according to one embodiment.

Figure 3:
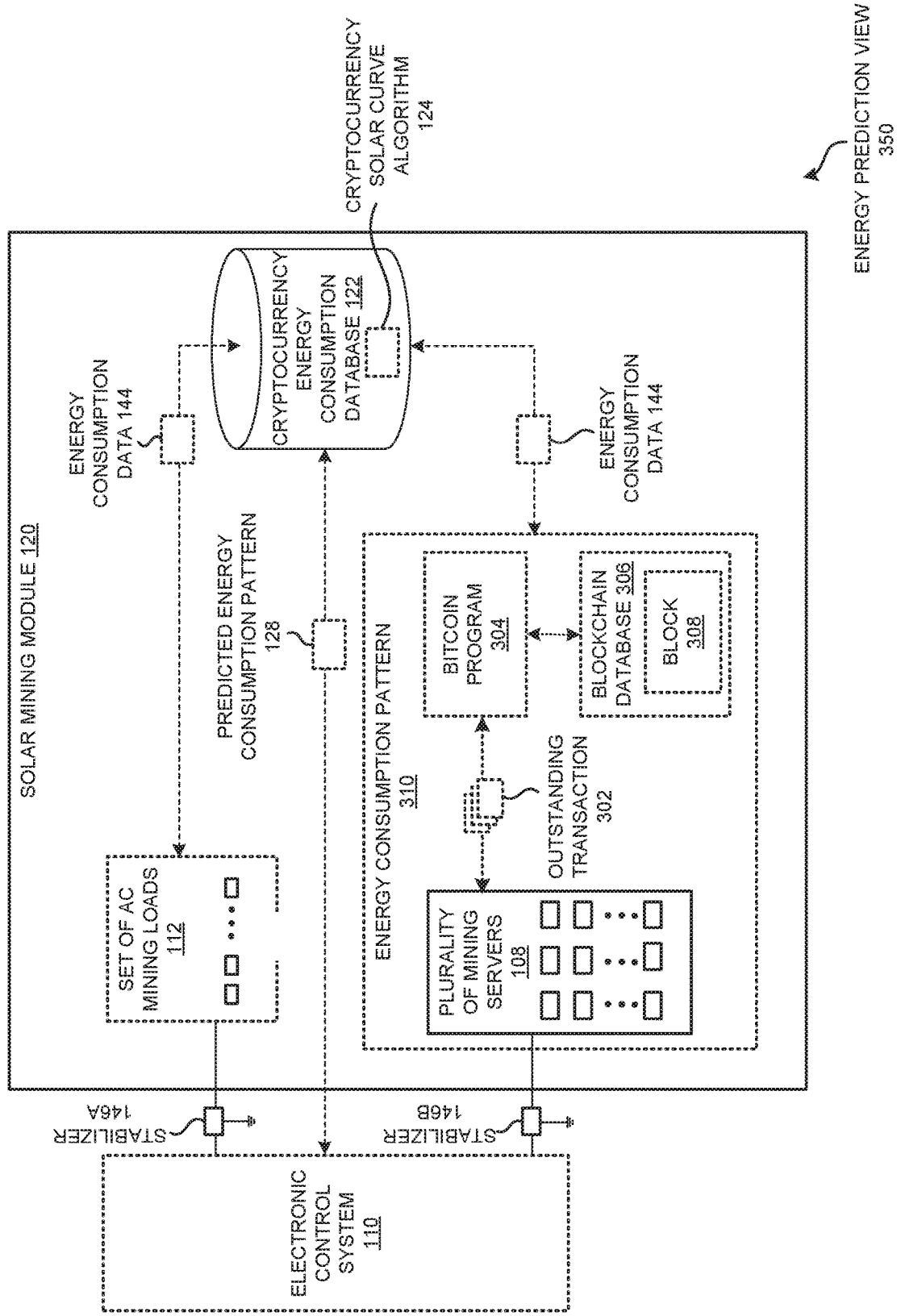
FIG. 3 is an energy prediction view illustrating the energy consumption analysis of plurality of mining servers in the solar mining module (e.g., mining node power management system) of the cryptocurrency computing power supply system of FIG. 1, according to one embodiment.

FIG. 3 is an energy prediction view 350 illustrating the energy consumption analysis of plurality of mining servers 108 in the solar mining module 120 (e.g., mining node power management system applying cryptocurrency solar curve algorithm 124) of cryptocurrency computing power supply system of FIG. 1, according to one embodiment. Particularly, FIG. 3 builds on FIGS. 1 to 2B, and further adds, an outstanding transaction 302, a bitcoin program 304, a blockchain database 306, and a block 308.

The outstanding transaction 302 may be a pending transfer of Bitcoin value that is broadcast to the network and collected into blocks 308 of the blockchain database 306. A transaction may typically reference previous transaction output as new transaction input and dedicate all input Bitcoin values to new outputs, according to one embodiment.

The bitcoin program 304 may be a software program to manage and help a miner of the plurality of mining servers 108 spend bitcoins. The bitcoin program 304 may maintain a long ledger called the blockchain that holds every transaction confirmed by the Bitcoin network. The Bitcoin network may consist of thousands of machines (e.g., plurality of mining servers 108) running the Bitcoin software. The Bitcoin network may have two main tasks to accomplish. One is relaying transaction information and the second is verifying those transactions to ensure the same bitcoins may not be spent twice, according to one embodiment.

The blockchain database 306 may be an assortment of data in the Bitcoin network wherein each participant (e.g., mining node, plurality of mining servers 108) may maintain, calculate and update new entries into the database. All nodes in the Bitcoin network may work together to ensure they are all coming to the same conclusions, providing in-built security for the network, according to one embodiment. The block 308 may be the transaction data that is permanently recorded in files in the blockchain database 306.

The mining nodes (e.g., plurality of mining servers 108) of the cryptocurrency data center may each group outstanding transactions 302 into blocks 308 and add them to a blockchain database 306. For example, the mining nodes (e.g., plurality of mining servers 108) may add transactions to the blockchain database 306 by solving a complex mathematical puzzle that is part of a bitcoin program 304, and including an answer in a block 308. For example, the complex mathematical puzzle that needs solving may be to find a number (e.g., "nonce", which is a concatenation of "number used once." In the case of bitcoin, the nonce is an integer between 0 and 4,294,967,296 that, when combined with the data in the block 308 and passed through a hash function, produces a result that is within a certain range. The number may be found by guessing at random. The hash function may make it impossible to predict what the output will be. So, miners (e.g., plurality of mining servers 108) may guess the mystery number and may apply the hash function to the combination of that guessed number and the data in the block 308. A resulting hash may have to start with a pre-established number of zeroes. There may be no way of knowing which number will work, because two consecutive integers may give wildly varying results. Moreover, there may be several numbers that produce a desired result, or there may be none (in which case the miners keep trying, but with a different block configuration), according to one embodiment.

The first miner to get a resulting hash within the desired range announces its victory to the rest of the network. All the other miners (e.g., plurality of mining servers 108) may immediately stop work on that block 308 and start trying to figure out the mystery number for the next block. As a reward for its work, the victorious miner may receive some new unit of the cryptocurrency, according to one embodiment.

A central processing unit (e.g., CPU, a processor) of each mining node (e.g., plurality of mining servers 108) of the cryptocurrency data center may need to continually process computations as fast as the maximum threshold of the CPU may operationally permit without burning out in order to maximize odds of finding the number. For example, the difficulty of the calculation (e.g., the required number of zeros at the beginning of the hash string) may be adjusted frequently, so that may take on average about 10 minutes to process a block (e.g., the amount of time that the bitcoin developers think is necessary for a steady and diminishing flow of new coins until the maximum number of 21 million is reached), according to one embodiment.

The cryptocurrency data center may have a strategic advantage by spreading increasing the odds that one of the mining nodes in the cryptocurrency data center contains the mystery number, according to one embodiment.

Different embodiments of present disclosure may effectively provide an uninterrupted power supply to the cryptocurrency mining by regulating the power generated by multiple power sources (e.g., solar DC power generation system 102 and/or AC power grid 114) in order to reduce power consumption from a utility grid and reduce the energy cost of the power distribution system. During the day, solar power may be almost free while in the night time utility power may be the cheapest. The electronic control system 110 of the solar mining module 120 (e.g., mining node power management system) may be configured to efficiently address the unique challenges of the cryptocurrency data center including automatic switching to the least expensive power source depending upon the time of the day and clear to cloudy skies, and/or power supply regulation, reliability, power quality, and reducing energy costs and preventing loss of power to the mining, according to one embodiment.

The electronic control system 110 of the solar mining module 120 (e.g., mining node power management system) may uniquely fulfill the power distribution challenges for the cryptocurrency data center caused by the computational complexity, continuous operation, and unique power consumption challenges caused by asymmetric power loads of the cryptocurrency data center by continuously updating the power supply requirement of the cryptocurrency mining based on the predicted energy consumption pattern 128 of the cryptocurrency energy consumption database 122. The electronic control system 110 may automatically control the power distribution to the plurality of mining servers 108 and ensure an uninterrupted power supply to the cryptocurrency data center using the predicted energy consumption pattern 128 derived from the energy consumption data 144 of the set of AC mining loads 112 and plurality of mining servers using the cryptocurrency solar curve algorithm of the cryptocurrency energy consumption database 124, according to one embodiment.

Figure 4A:
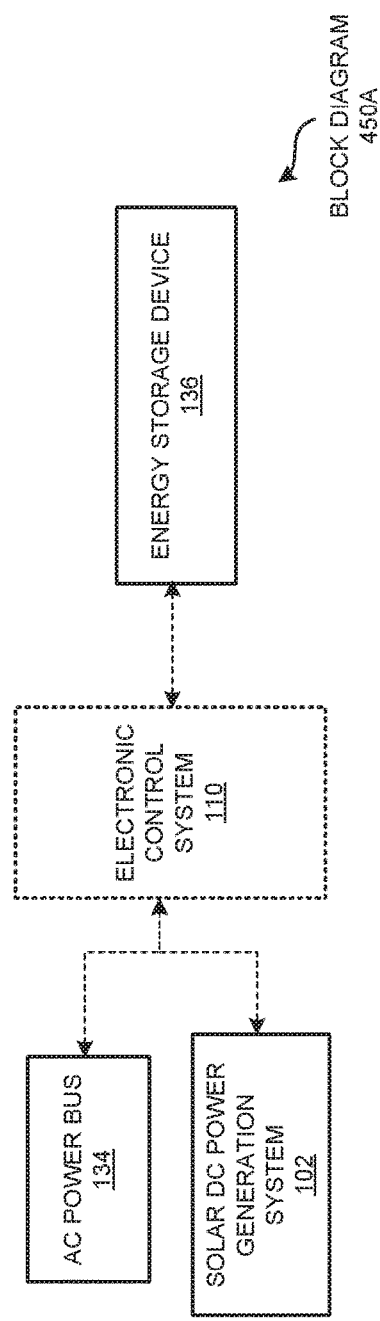
FIG. 4A is a block diagram illustrating an electronic control system of the cryptocurrency computing power supply system of FIG. 1 configured to control the power supply to an energy storage device.

FIG. 4A is a block diagram 450A illustrating an electronic control system 110 of the cryptocurrency computing power supply system of FIG. 1 configured to control the power supply to an energy storage device 136. According to one embodiment, the electronic control system 110 of the cryptocurrency computing power supply system of FIG. 1 may be configured to heterogeneously supply power from the AC power bus 134 and/or the solar DC power generation system 102 to the energy storage device 110 by automatically switching to the least expensive power source depending upon the time of the day and clear to cloudy skies, power supply regulation, reliability, power quality, and reducing energy costs and preventing loss of power to a mining, according to one embodiment.

Figure 4B:
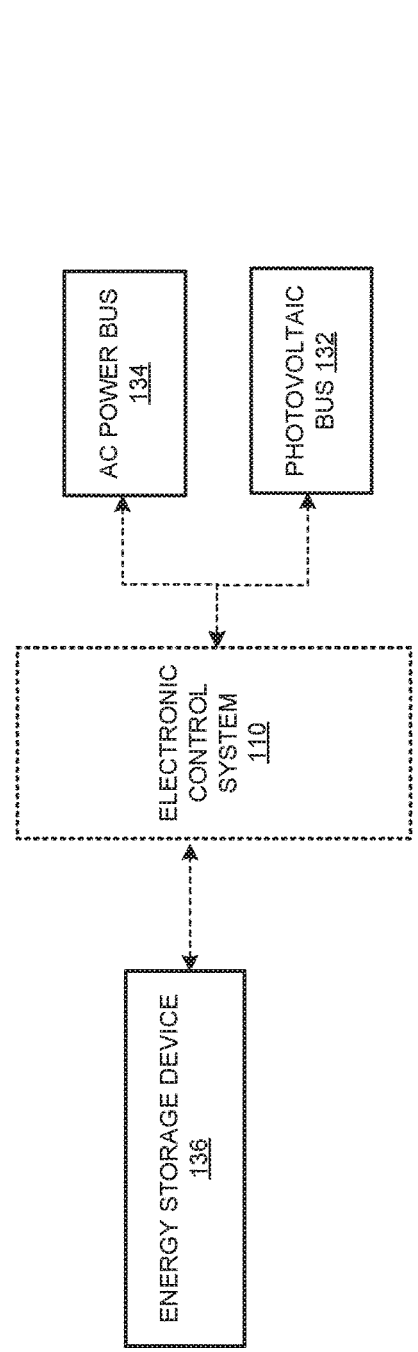
FIG. 4B is another block diagram illustrating the electronic control system of the cryptocurrency computing power supply system of FIG. 1 configured to control the power supply from the energy storage device, according to one embodiment.

FIG. 4B is another block diagram 450B illustrating the electronic control system 110 of the cryptocurrency computing power supply system of FIG. 1 configured to control the power supply from the energy storage device 136, according to one embodiment. The electronic control system 110 of the cryptocurrency computing power supply system of FIG. 1 may be configured to control the power supply from the energy storage device 136 to the AC power bus 134 and/or the photovoltaic bus 132 at the time of power supply failure from the AC power grid 114 and/or solar DC power generation system 102, and to prevent loss of power to the mining. At the time of power supply failure from the AC power grid 114 and/or AC generator 116, the electronic control system 110 may automatically open power breaker 140A and 140B, and close switch 138A and power breaker 140C to ensure continuous power supply to the set of AC mining loads 112 and plurality of mining servers 108 from the energy storage device 136 through the AC power bus 134 and/or the photovoltaic bus 132, according to one embodiment.

Figure 5:
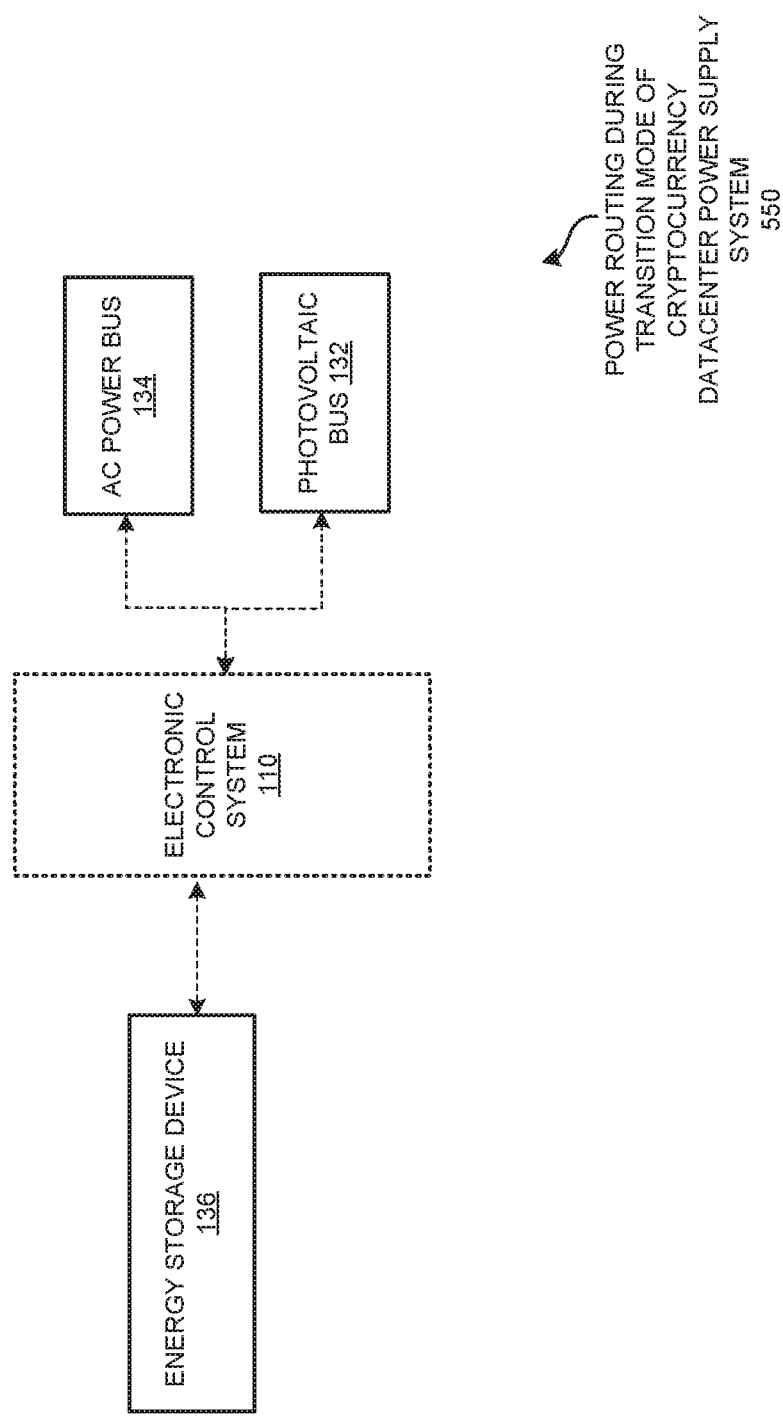
FIG. 5 is a block diagram illustrating the transition mode of the cryptocurrency computing power supply system of FIG. 1, according to one embodiment.

FIG. 5 is a block diagram 550 illustrating the transition mode of the cryptocurrency computing power supply system of FIG. 1, according to one embodiment. During the transition of cryptocurrency computing power supply system from first operating mode to second operating mode, the electronic control system 110 may be structured to route power from the energy storage device 136 to the photovoltaic bus 132 and/or the AC power bus 134. In an alternate embodiment, during the transition of cryptocurrency computing power supply system from second operating mode to first operating mode, the electronic control system 110 may be structured to route power from the energy storage device 136 to the photovoltaic bus 132 and/or the AC power bus 134, according to one embodiment.

Figure 6:
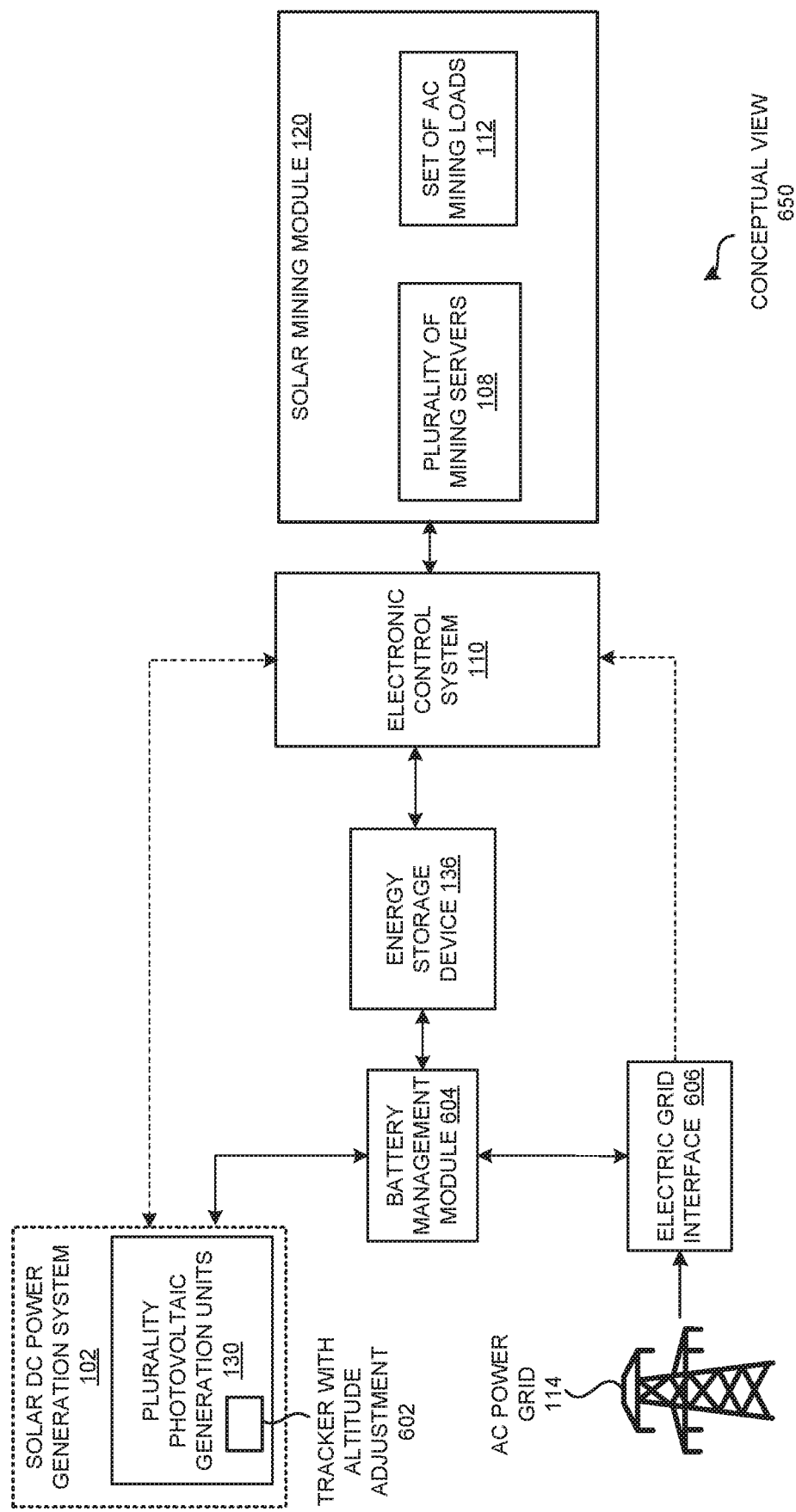
FIG. 6 is a conceptual view illustrating another embodiment of the cryptocurrency computing power supply system of FIG. 1, according to one embodiment.

FIG. 6 is a conceptual view 650 illustrating another embodiment of the cryptocurrency computing power supply system of FIG. 1. Particularly, FIG. 6 builds on FIGS. 1 to 5, and further adds, a tracker with altitude adjustment 602, a battery management module 604, and an electric grid interface 606, according to one embodiment.

The plurality of photovoltaic generation units 130 may have each have a tracker with altitude adjustment 602 to adjust the direction of solar panels and/or modules toward the sun. The plurality of photovoltaic generation units 130 may include a device to change their orientation throughout the day to follow the sun's path to maximize energy capture. The trackers of the plurality of photovoltaic generation units 130 may help minimize the angle of incidence (e.g., the angle that a ray of light makes with a line perpendicular to the surface) between the incoming light and the panel, which increases the amount of energy the installation produces. The single-axis solar tracker may rotate on one axis moving back and forth in a single direction. Different types of single-axis trackers may include horizontal, vertical, tilted, and/or polar aligned, which rotate as the names imply. The conversion efficiency of the plurality of photovoltaic generation units 130 may be improved by continually adjusting the modules of the plurality of photovoltaic generation units 130 to the optimum angle as the sun traverses the sky, according to one embodiment.

Trackers of the plurality of photovoltaic generation units 130 in the cryptocurrency computing power supply system may direct solar panels and/or modules toward the sun. Tracking systems may collect the sun's energy with maximum efficiency when the optical axis is aligned with incident solar radiation, according to one embodiment.

The tracker of the plurality of photovoltaic generation units 130 in the cryptocurrency computing power supply system may help substantially increase the generation potential of the plurality of photovoltaic generation units 130. The solar panels of the plurality of photovoltaic generation units 130 may be tilted at required angles for efficiently increasing power generation. The solar panels of the plurality of photovoltaic generation units 130 may be adjusted at latitude +15 degrees in winter and latitude −15 degrees in summer for maximum power generation. The plurality of photovoltaic generation units 130 in the cryptocurrency computing power supply system may use polycrystalline solar array for higher energy density and increased generation capacity of the solar array, according to one embodiment.

The battery management module 604 of the solar mining module 120 may be a software component and/or part of a program to control the switching of power supply from the solar DC power generation system 102 and/or AC power grid 114 for optimally charging the energy storage device 136. The battery management module 604 may allow optimal charging of the energy storage device 136 depending on the least expensive power source depending upon the time of the day and clear to cloudy skies, power supply regulation. The battery management module 604 may include a power storage facility (e.g., energy storage device 136), according to one embodiment.

The electric grid interface 606 may be a system to allow the solar mining module 120 (e.g., mining node power management system) to receive power supply in a plurality of different modes. The electric grid interface 606 may allow the solar mining module 120 to draw from different power supply sources. In case of power failure, the electric grid interface 606 may allow the solar mining module 120 to switch automatically from solar DC power generation system 102 to the AC power grid 114. During the transition of once power supply source to another, the electric grid interface 606 may automatically maintain a stable power supply from the power storage facility (e.g., energy storage device 136) of the solar mining module 120, according to one embodiment.

According to an exemplary embodiment, the power management system for the cryptocurrency mining servers (e.g., plurality of mining servers 108) may include a solar array system (e.g., plurality of photovoltaic generation units 130), a battery management module 604, and an electric grid interface 606. The solar array system may use polycrystalline solar array for higher energy density and the increased generation capacity. The battery management module 604 may include a power storage facility. The battery of the battery management module 604 may be charged by the solar power generated from the solar array (e.g., plurality of photovoltaic generation units 130). The whole power from solar panels (e.g., plurality of photovoltaic generation units 130) during the daytime hours, on-peak hours during the day will be generated for no fuel. The battery system (e.g., energy storage device 136) may support the cryptocurrency mining server farm (e.g., cryptocurrency mining farm 902) during power cuts through the day, according to one embodiment.

The power management system connected to the electric grid interface 606 may be plugged into the local power grid (e.g., AC power grid 114). In case of power failure from solar array (e.g., plurality of photovoltaic generation units 130), the intelligent system (e.g., battery management module 604) of the power management system may pull power and automatically switch from solar power to the electric power grid (e.g., AC power grid 114). The power management system for the cryptocurrency mining servers may have three sources of power. It's like a hybrid system. Sometimes power management system (e.g., solar mining module 120) may be receiving power from the batteries (e.g., energy storage device 136), sometimes it may be receiving power from the generator (e.g., AC generator 116) and sometimes it may be receiving power from the gasoline engine. The power management system (e.g., solar mining module 120) may have three energy storage systems, it may have the solar array (e.g., plurality of photovoltaic generation units 130), the battery system (e.g., energy storage device 136) and the local power grid (e.g., AC power grid 114), all are controlled by the power management system. The power management system (e.g., solar mining module 120) may work like the master brain that keeps tabs on the solar array (e.g., plurality of photovoltaic generation units 130), the battery management module 604 and the electric grid interface. The power management system (e.g., solar mining module 120) may control from where the power is coming from in any given second of the day. The solar array (e.g., plurality of photovoltaic generation units 130) may be managed by single axis tracking and altitude adjustment using tracker with altitude management 602, according to one embodiment.

The solar array system (e.g., plurality of photovoltaic generation units 130) may get dramatically higher generation from the solar cells if the sun is tracked across the sky throughout the day. It may give 9 plus hours of perpendicular solar rays. It will have incidence of all photons on the solar cell for 9-9.5 hours of the day. The altitude adjustment may be done manually. The power management system (e.g., solar mining module 120) may generate a more efficient way to harvest electrical energy using the solar array (e.g., plurality of photovoltaic generation units 130), according to one embodiment.

Figure 7:
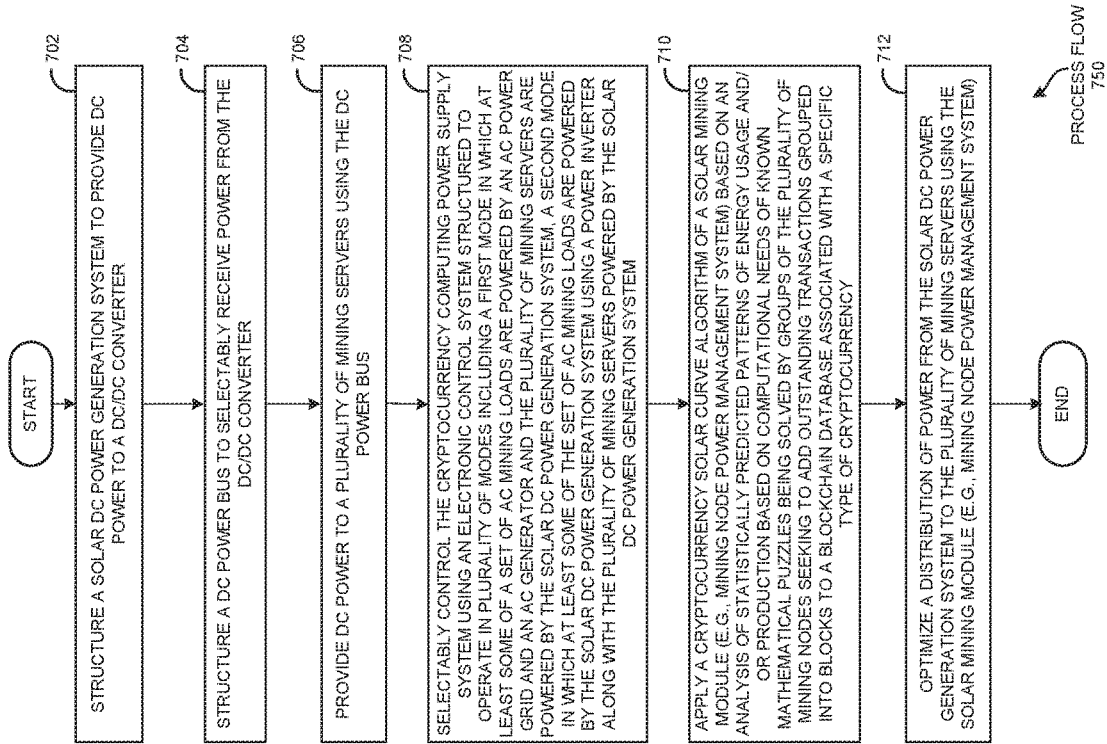
FIG. 7 is a process flow detailing the operations involved in optimizing the power distribution using the cryptocurrency solar curve algorithm of the cryptocurrency energy consumption database of the solar mining module of FIG. 1, according to one embodiment.

FIG. 7 is a process flow 750 detailing the operations involved in optimizing the power distribution using the cryptocurrency solar curve algorithm 124 of the cryptocurrency energy consumption database 122 of the solar mining module 120 of FIG. 1, according to one embodiment.

In operation 702, the cryptocurrency computing power supply system may structure a solar DC power generation system 102 to provide DC power to a DC/DC converter 104. In operation 704, the cryptocurrency computing power supply system may structure a DC power bus 106 to selectably receive power from the DC/DC converter 104. In operation 706, the cryptocurrency computing power supply system may provide DC power to a plurality of mining servers 108 using the DC power bus 106, according to one embodiment.

In operation 708, the cryptocurrency computing power supply system may selectablycontrol the cryptocurrency computing power supply system using an electronic control system 110 structured to operate in plurality of modes including a first mode in which at least some of a set of AC mining loads 112 are powered by an AC power grid 114 and an AC generator 116 and the plurality of mining servers 108 are powered by the solar DC power generation system 102. In a second mode, at least some of the set of AC mining loads 112 are powered by the solar DC power generation system 102 using a power inverter along with the plurality of mining servers 108 powered by the solar DC power generation system 102, according to one embodiment.

In operation 710, the cryptocurrency computing power supply system may apply a cryptocurrency solar curve algorithm 124 of a solar mining module 120 based on an analysis of statistically predicted patterns of energy usage and/or production based on computational needs of known mathematical puzzles being solved by groups of the plurality of mining nodes (e.g., plurality of mining servers 108) seeking to add outstanding transactions grouped into blocks to a blockchain database associated with a specific type of cryptocurrency, according to one embodiment.

In operation 712, the cryptocurrency computing power supply system may optimize a distribution of power from the solar DC power generation system 102 to the plurality of mining servers 108 using the solar mining module 120.

Figure 8:
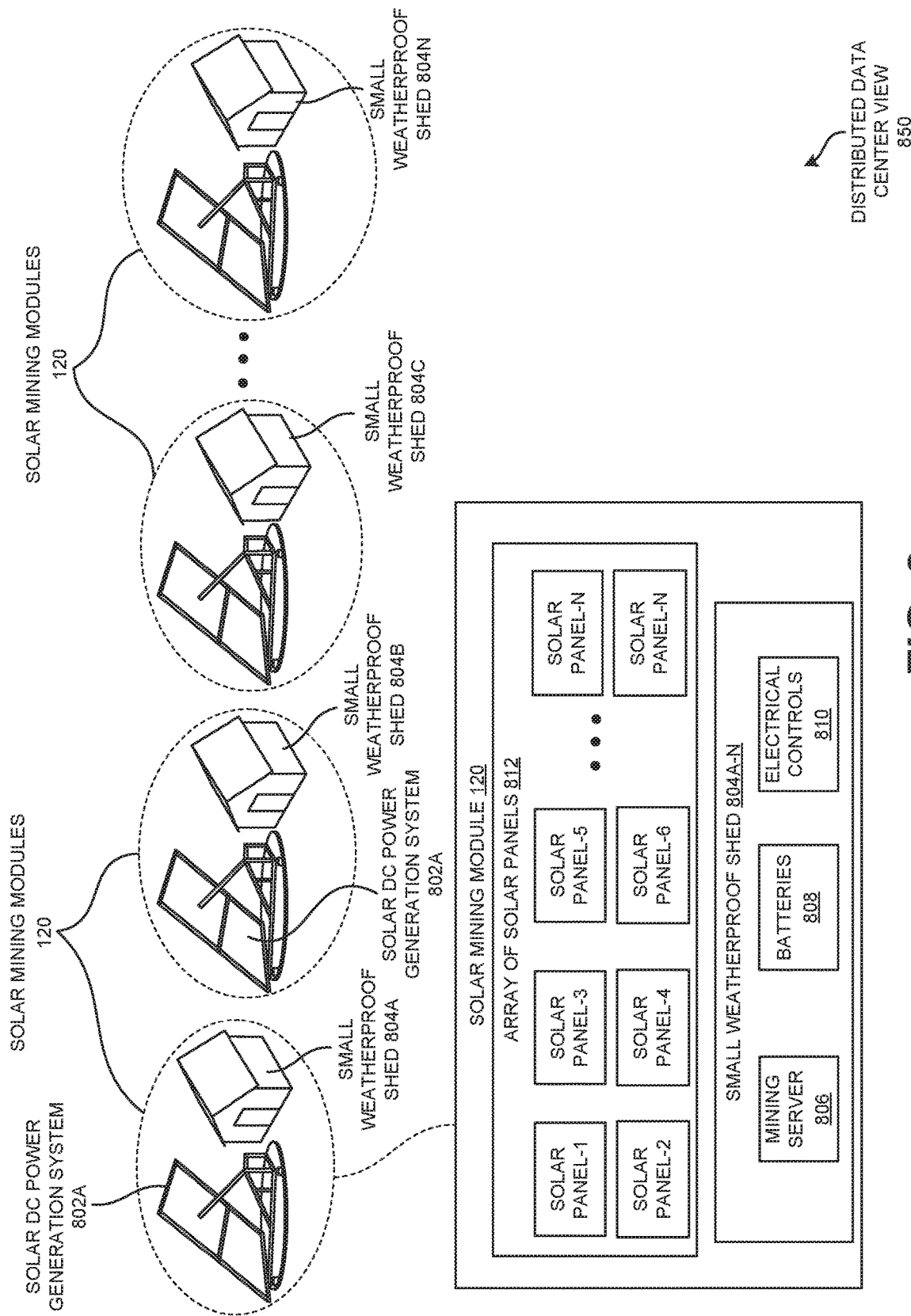
FIG. 8 is a preferred embodiment illustrating a distributed data center view of the cryptocurrency computing power supply system of FIG. 1 deployed in a scattered environment spread across different geographical area.

FIG. 8 is a distributed data center view 850 of the cryptocurrency computing power supply system of FIG. 1 deployed in a scattered environment spread across different geographical area. Particularly, FIG. 8 illustrates an exemplary embodiment of the plurality of cryptocurrency computing power supply system may be deployed to power different set of mining loads 812A-N located in different geographical areas by establishing a solar DC generation system 802A-N in the same geographical area to optimize the power supply resources efficiently. Each of the individual set of mining loads 812A-N distributed across different geographical areas may be powered by the solar DC generation system 802A-N located in the same geographical area, according to one embodiment.

In a preferred embodiment, the solar mining modules 120 may include an array of solar panels 812(1-N) and modular groupings of mining servers 806 housed in a group of small weatherproof sheds 804A-N. In addition, the small weatherproof shed 804A-N may include batteries 808 and electrical controls 810 to manage power distribution across plurality of mining servers 806 of the solar mining modules 120. In another embodiment, the electrical controls 810 may be the electronic control system 110 of the cryptocurrency computing power supply system 150 of FIG. 1 in a distributed environment.

Figure 9:
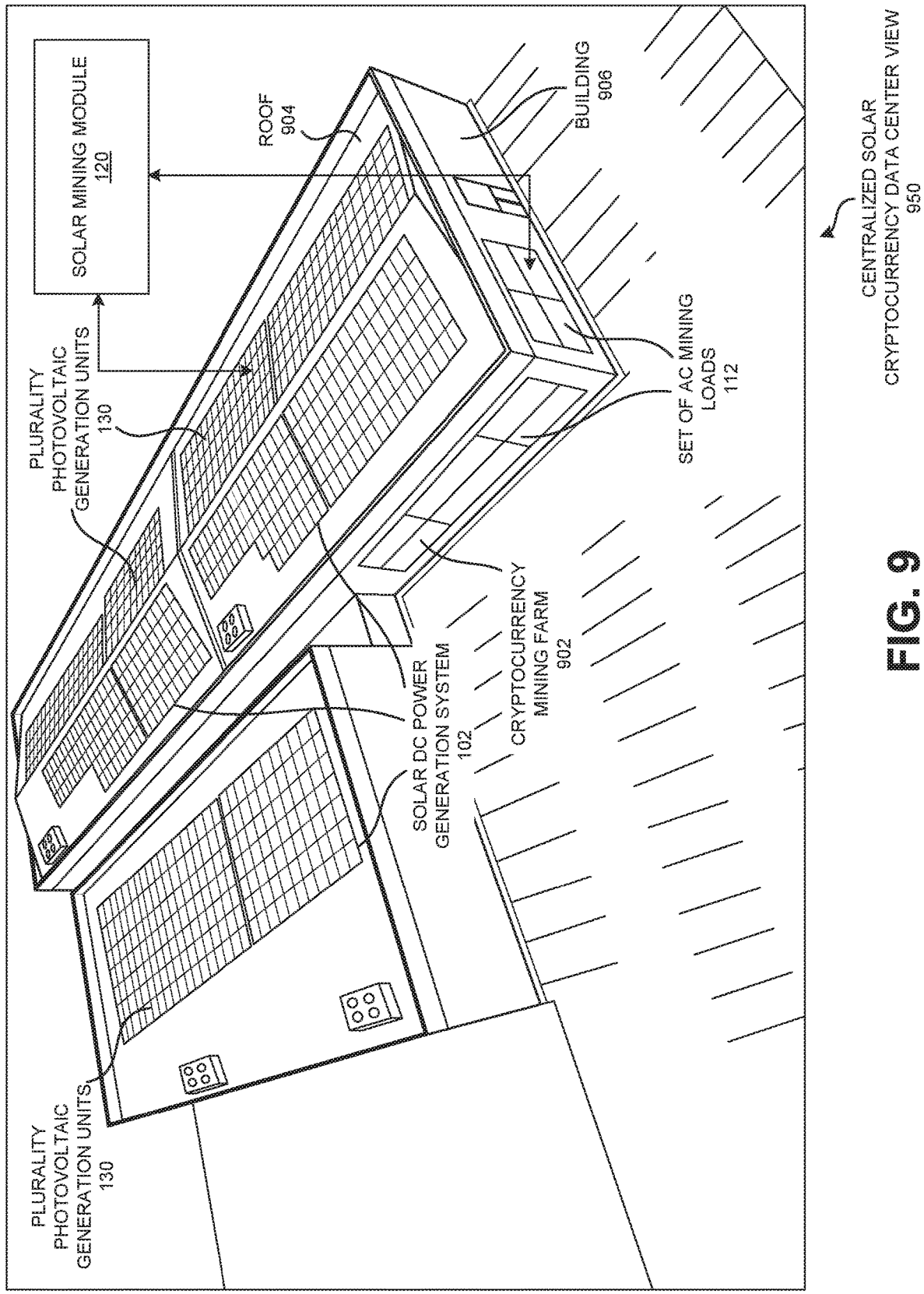
FIG. 9 is an alternative embodiment illustrating a centralized solar cryptocurrency data center view of the cryptocurrency computing power supply system of FIG. 1 deployed in an integrated environment.

FIG. 9 is a centralized solar cryptocurrency data center view 950 of the cryptocurrency computing power supply system of FIG. 1 deployed in an integrated environment. According to one embodiment, the cryptocurrency computing power supply system of FIG. 1 may be deployed to provide an uninterrupted power supply to cryptocurrency mining farm 902 located in a single geographical area. The cryptocurrency mining farm 902 may include thousands of mining nodes located in a single geographical area running continuously for mining the cryptocurrency. The solar DC power generation system 102 may be used to meet the power supply requirements of the to cryptocurrency mining farm 902 by installing plurality of photovoltaic generation units 130 at the roof 904 of the building 906 used for housing the cryptocurrency mining farm 902. The centralized solar cryptocurrency data center may help ensuring continuous power supply to the plurality of mining servers 108 by reducing the transmission loss and efficient power supply management using the cryptocurrency solar curve algorithm 124 of the solar mining module 120 (e.g., mining node power management system) of FIG. 1, according to one embodiment.

An example embodiment will now be described. ACME BitCo Network may be operating a cryptocurrency mining farm running thousands of its mining servers in its facility. The mining farm of ACME BitCo Network may be consuming continuous amounts of energy for running its facility and providing air conditioning and other cooling systems to the farm. The ACME BitCo Network may be facing intermittent power outage situations due to ineffective power supply management from its existing power sources, including utility power grids and solar power systems, causing huge monetary loss.

To overcome its recurring power outage situations, the ACME BitCo Network may have installed the new cryptocurrency computing power supply system as described in various embodiments of FIGS. 1 to 9 for improved power supply management to its cryptocurrency mining far. The new cryptocurrency computing power supply system as described in various embodiments of FIGS. 1 to 9 may have helped the ACME BitCo Network to effectively power its cryptocurrency mining facility by regulating the power generated by multiple power sources (e.g., solar power generation system 102 and AC power grid 114). The new cryptocurrency computing power supply system as described in various embodiments of FIGS. 1 to 9 may have helped in reducing the power consumption from the utility grid and reduced the energy cost of the power distribution system by automatically controlling the power supply in the facility, making it efficient and preventing loss of financial resources. The ACME BitCo Network may now be able to manage its power supply needs based on the predicted energy consumption patterns 128 of its mining nodes in the facility using the electronic control system 110 of the new cryptocurrency computing power supply system.

Solar Mining Modules (SMMs) 120 may be replicated and/or combined to create a Solar Mining Array (SMA) of any size. Each Solar Mining Module 120 may be self-contained and may operate independently. In a preferred embodiment SMMs 120 may be relatively small which solves one of the key problems with solar power generation: much of the electrical energy may lost over transmitting power across a solar array to the power grid, to converting it from DC to AC, and from transforming voltage. By avoiding most of these elements, embodiments described herein may capturing a much higher % of the raw electrical power that each solar cell actually produces (this might be more than 30% savings of power that is typically lost).

Illustrative SMM Design may be 55 kW of cryptocurrency mining servers 806 and 54 kW of solar panels (180 panels at 0.3 kW per panel). Example solar panel 812 may have Approx Dimensions: 2 m×1 m, and 300 Watts. Example of mount/tracking system in a preferred embodiment may holds 30 panels (so 6 tracking systems usable). Approx Dimensions may be: 12 m long×5 m wide×4 m tall. Example of mining server 806 in a preferred embodiment may be a Bitmain Antminer S9 having Approx Dimensions (with PSU): 30 cm×20 cm×46 cm. In a preferred embodiment, a battery module may have approx Dimensions may be: 0.8 m×1.75 m. Overall SMM Dimensions may be: Length: 40 m, Width: 12 m, Height: 4 m.

It should be noted that the electronic control system 110 and the solar mining module 120 (an example mining node power management system) discussed above may be implemented through electrical/electronic circuits, software/firmware instructions executing on data processing devices and/or a combination thereof. Further, it should be noted that the solar mining module 120 may apply cryptocurrency solar algorithm 124 through execution thereof on one or more processor(s) associated therewith.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A cryptocurrency computing power supply system comprising:
    a solar DC power generation system to provide DC power to a DC/DC converter, the solar DC power generation system comprising a plurality of photovoltaic generation units, each of which comprises a tracker;
    a DC power bus to selectably receive the DC power from the DC/DC converter; a plurality of mining servers to receive the DC power provided using the DC power bus;
    an electronic control system to selectably control the cryptocurrency computing power supply system to operate in a plurality of modes including
    a first mode in which at least some of a set of AC mining loads are powered by an AC power grid and an AC generator and the plurality of mining servers are powered by the solar DC power generation system, and
    a second mode in which the at least some of the set of AC mining loads are powered by the solar DC power generation system using a power inverter along with the plurality of mining servers powered by the solar DC power generation system; and
    a mining node power management system to apply a cryptocurrency solar curve algorithm based on an analysis of statistically predicted patterns of energy usage and production relevant to known mathematical puzzles being solved by groups of the plurality of mining servers seeking to add outstanding transactions grouped into blocks to a blockchain database associated with a specific type of cryptocurrency,
    the cryptocurrency solar curve algorithm further providing a predicted energy consumption pattern based on energy consumption data received from at least one of:
    the plurality of mining servers and the set of AC mining loads,
    wherein the tracker of the each of the plurality of photovoltaic generation units adjusts orientation of components of the each of the plurality of photovoltaic generation units such that solar energy captured thereby is maximized, and
    wherein the mining node power management system further optimizes distribution of power from the solar DC power generation system to the plurality of mining servers based on the first mode and the second mode and the application of the cryptocurrency solar curve algorithm in accordance with monitoring the each of the plurality of photovoltaic generation units comprising the tracker.

2. The cryptocurrency computing power supply system of claim 1, wherein the solar DC power generation system further comprises:
    a photovoltaic bus operatively coupled with the plurality of photovoltaic generation units and the DC/DC converter; and
    a second converter including a DC link operatively coupled with the photovoltaic bus, a first output operatively coupled with an AC power bus, and a second output operatively coupled with an energy storage device.

3. The cryptocurrency computing power supply system of claim 2, wherein the energy storage device comprises an electric machine coupled with at least one of a flywheel, a battery, and a supercapacitor.

4. The cryptocurrency computing power supply system of claim 2, wherein the electronic control system is structured to control the cryptocurrency computing power supply system to selectably supply power from at least one of the AC power bus and the solar DC power generation system to the energy storage device.

5. The cryptocurrency computing power supply system of claim 2, wherein the electronic control system is structured to selectably supply power from the energy storage device to at least one of the AC power bus and the photovoltaic bus.

6. The cryptocurrency computing power supply system of claim 2, wherein the electronic control system is structured to route power from the energy storage device to at least one of the photovoltaic bus and the AC power bus during a transition from at least one of the first mode and the second mode.

7. The cryptocurrency computing power supply system of claim 2, wherein the solar DC power generation system further comprises a plurality of fuel cells structured to output the DC power to the DC/DC converter.

8. The cryptocurrency computing power supply system of claim 7, wherein the electronic control system is structured to control the cryptocurrency computing power supply system to selectably supply power from the plurality of fuel cells to at least one of the DC power bus alone and a combination of the DC power bus and the AC power bus.

9. The cryptocurrency computing power supply system of claim 1, wherein the solar DC power generation system further comprises:
- a solar DC power source;
- a second DC power bus operatively coupled with the solar DC power source and the DC/DC converter; and
- a second converter operatively coupled with the second DC power bus and including a first output operatively coupled with an AC power bus, and a second output operatively coupled with an energy storage device.

10. A cryptocurrency computing power supply system comprising:
- a plurality of computers operating as a plurality of mining servers that continuously consumes energy in a predictable pattern based on a type of cryptocurrency being mined;
- a solar DC power generation system to provide DC power to a DC/DC converter, the solar DC power generation system comprising a plurality of photovoltaic generation units, each of which comprises a tracker;
- a DC power bus to selectably receive power from the DC/DC converter and to provide the DC power to the plurality of mining servers;
- an electronic control system to selectably control the cryptocurrency computing power supply system to operate in a plurality of modes including
- a first mode in which at least some of a set of AC mining loads are powered by an AC power grid and an AC generator and the plurality of mining servers is powered by the solar DC power generation system, and
- a second mode in which the at least some of the set of AC mining loads are powered by the solar DC power generation system using a power inverter along with the plurality of mining servers powered by the solar DC power generation system; and
- a mining node power management system to apply a cryptocurrency solar curve algorithm based on an analysis of statistically predicted patterns of energy usage and production relevant to known mathematical puzzles being solved by groups of the plurality of mining servers seeking to add outstanding transactions grouped into blocks to a blockchain database associated with the type of cryptocurrency mined, the cryptocurrency solar curve algorithm further providing a predicted energy consumption pattern based on energy consumption data received from at least one of: the plurality of mining servers and the set of AC mining loads,
- wherein the tracker of the each of the plurality of photovoltaic generation units adjusts orientation of components of the each of the plurality of photovoltaic generation units such that solar energy captured thereby is maximized, and
- wherein the mining node power management system further optimizes distribution of power from the solar DC power generation system to the plurality of mining servers based on the first mode and the second mode and the application of the cryptocurrency solar curve algorithm in accordance with monitoring the each of the plurality of photovoltaic generation units comprising the tracker.

11. The cryptocurrency computing power supply system of claim 10, wherein the solar DC power generation system further comprises:
- a photovoltaic bus operatively coupled with the plurality of photovoltaic generation units and the DC/DC converter; and
- a second converter including a DC link operatively coupled with the photovoltaic bus, a first output operatively coupled with an AC power bus, and a second output operatively coupled with an energy storage device.

12. The cryptocurrency computing power supply system of claim 11, wherein the energy storage device comprises an electric machine coupled with at least one of a flywheel, a battery, and a supercapacitor.

13. The cryptocurrency computing power supply system of claim 11, wherein the electronic control system is structured to control the cryptocurrency computing power supply system to selectably supply power from at least one of the AC power bus and the solar DC power generation system to the energy storage device.

14. The cryptocurrency computing power supply system of claim 11, wherein the electronic control system is structured to selectably supply power from the energy storage device to at least one of the AC power bus and the photovoltaic bus.

15. The cryptocurrency computing power supply system of claim 11, wherein the electronic control system is structured to route power from the energy storage device to at least one of the photovoltaic bus and the AC power bus during a transition from at least one of the first mode and the second mode.

16. The cryptocurrency computing power supply system of claim 11, wherein the solar DC power generation system further comprises a plurality of fuel cells structured to output the DC power to the DC/DC converter.

17. The cryptocurrency computing power supply system of claim 16, wherein the electronic control system is structured to control the cryptocurrency computing power supply system to selectably supply power from the plurality of fuel cells to at least one of the DC power bus alone and a combination of the DC power bus and the AC power bus.

18. The cryptocurrency computing power supply system of claim 10, wherein the solar DC power generation system further comprises:
- a solar DC power source;
- a second DC power bus operatively coupled with the solar DC power source and the DC/DC converter; and
- a second converter operatively coupled with the second DC power bus and including a first output operatively coupled with an AC power bus, and a second output operatively coupled with an energy storage device.

19. A cryptocurrency computing power supply system comprising: a solar DC power generation system to provide DC power to a DC/DC converter, the solar DC power generation system comprising:
- a plurality of photovoltaic generation units, each of which comprises a tracker; and
- a plurality of fuel cells to output the DC power to the DC/DC converter;
- a DC power bus to selectably receive the DC power from the DC/DC converter;
- a plurality of mining servers to receive the DC power provided using the DC power bus;
- an electronic control system to selectably control the cryptocurrency computing power supply system to operate in a plurality of modes including
- a first mode in which at least some of a set of AC mining loads are powered by an AC power grid and an AC generator and the plurality of mining servers are powered by the solar DC power generation system, and
- a second mode in which the at least some of the set of AC mining loads are powered by the solar DC power generation system using a power inverter along with the plurality of mining servers powered by the solar DC power generation system; and a mining node power management system to apply a cryptocurrency solar curve algorithm based on an analysis of statistically predicted patterns of energy usage and production relevant to known mathematical puzzles being solved by groups of the plurality of mining servers seeking to add outstanding transactions grouped into blocks to a blockchain database associated with a specific type of cryptocurrency, the cryptocurrency solar curve algorithm further providing a predicted energy consumption pattern based on energy consumption data received from at least one of: the plurality of mining servers and the set of AC mining loads, wherein the tracker of the each of the plurality of photovoltaic generation units adjusts orientation of components of the each of the plurality of photovoltaic generation units such that solar energy captured thereby is maximized, and wherein the mining node power management system further optimizes distribution of power from the solar DC power generation system to the plurality of mining servers based on the first mode and the second mode and the application of the cryptocurrency solar curve algorithm in accordance with monitoring the each of the plurality of photovoltaic generation units comprising the tracker.

20. The cryptocurrency computing power supply system of claim 19, wherein the solar DC power generation system further comprises:

a photovoltaic bus operatively coupled with the plurality of photovoltaic generation units and the DC/DC converter; and a second converter including a DC link operatively coupled with the photovoltaic bus, a first output operatively coupled with an AC power bus, and a second output operatively coupled with an energy storage device.

* * * * *